Jan. 4, 1938. J. H. ODENBACH ET AL 2,104,053
WELDED HULL CONSTRUCTION
Filed Oct. 28, 1935 3 Sheets-Sheet 1

INVENTORS
JOHN H. ODENBACH
JOHN CATTANACH
BY Mathias R. Kondolf
ATTORNEY

INVENTORS
JOHN H. ODENBACH
JOHN CATTANACH
BY Mathias R. Kondoff
ATTORNEY

Jan. 4, 1938.  J. H. ODENBACH ET AL  2,104,053
WELDED HULL CONSTRUCTION
Filed Oct. 28, 1935  3 Sheets-Sheet 3
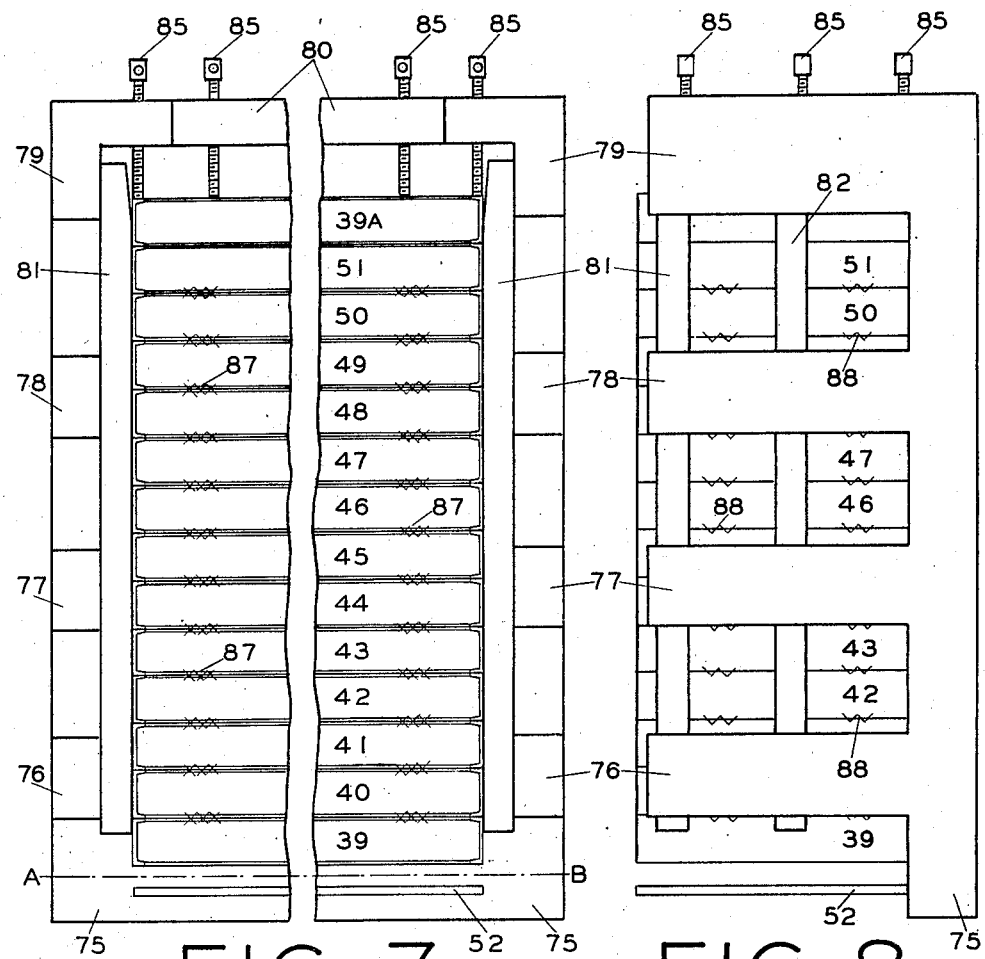
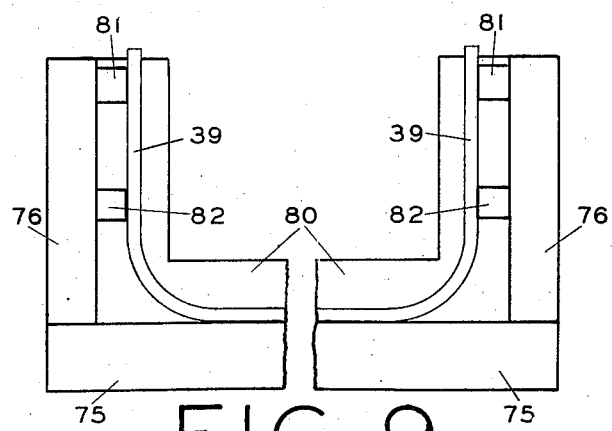
INVENTORS
JOHN H. ODENBACH
JOHN CATTANACH
BY Mathias R. Kondolf
ATTORNEY Patented Jan. 4, 1938

2,104,053

UNITED STATES PATENT OFFICE 2,104,053

WELDED HULL CONSTRUCTION

John H. Odenbach and John Cattanach, Rochester, N. Y., assignors, by direct and mesne assignments, to Dolomite Marine Corporation, Rochester, N. Y., a corporation of New York Application October 28, 1935, Serial No. 47,006

12 Claims. (Cl. 114—79)

This invention relates to an improved method of constructing a ship and the improved product resulting from the use of such method. It applies particularly to welded hull construction.

The use of welding for hull construction has been restricted because of the uncertainty of obtaining welded joints which were equal in strength and corrosion resistance to the parent metal of the individual members forming the hull.

It is common knowledge that molten steel has an affinity for oxygen and nitrogen. When exposed to the air molten steel enters into chemical combination with the oxygen and nitrogen of the air to form oxides and nitrides in the steel. These impurities in the steel tend to weaken and embrittle it as well as lessen its resistance to corrosion.

The discovery and development of "shielded arc" electric welding has been a great step forward in the art. The shielded arc method of welding comprises the use of a welding rod provided with a suitable coating. The heat of the arc melts the coating which flows down and is partly gasified to surround the arc with an ambient atmosphere of inert gas. The coating also provides a slag cover to protect the molten metal of the weld while it is setting.

Welds made with a completely shielded arc are largely free of oxides and nitrides and are therefore composed of metal having superior physical and chemical characteristics to that deposited by an ordinary arc. For example, welds made with a shielded arc have a tensile strength of 60,000 to 80,000 pounds per square inch which is 20% to 50% higher tensile strength than that possessed by welds deposited by an ordinary arc. The ductility of welds made with a shielded arc averages 100% to 200% greater than that of welds made with an ordinary arc. The fatigue resistance and the impact resistance of welds made with a shielded arc are likewise greatly increased over that of welds made with an ordinary arc. The resistance to corrosion of shielded arc welds is at least as great as that of mild rolled steel and far greater than that of welds made with an unshielded arc.

The density of the weld metal deposited by a shielded arc conforms closely to that of mild rolled steel, that is, approximately 7.86 grams per cubic centimeter. The density of the weld metal deposited by an ordinary arc averages from 7.5 to 7.7 grams per cubic centimeter. This difference arises from the impurities present in the latter case.

The importance of a completely shielded arc is pointed out. It is obvious that the rod coating and the gaseous envelope formed thereby, as well as the slag layer on top of the molten metal, will not function to full efficiency—and the superior physical characteristics of the weld will not be certain—unless the joint being welded is in a horizontal position.

To construct the hull of a ship from members welded together while the joints between such members are in a horizontal position, we revolve the hull sections about a horizontal axis to bring all of the joints into horizontal position for welding. This is an essential step in our improved method of hull construction.

In carrying out our improved method we find it advantageous to form the hull from a series of sections—each section being comprised of a number, or group of members, aligned and permanently welded into a complete section prior to incorporation in the hull of the ship.

To secure maximum strength with the minimum amount of material, we prefer to use members which extend around the hull from gunwale to gunwale. These members may be of any suitable shape but we find that commercial channel sections are well adapted for the purpose.

The individual members are pre-formed and we have found that the apparatus described in our prior patent, 1,970,182, of August 14, 1934, is suitable for this purpose. A number of such members are then aligned and tack welded or otherwise fastened together—to preserve such alignment.

It will be understood that commercial channel sections are not absolutely straight and, particularly after bending, some distortion is apt to exist. To overcome this distortion and align the members, we prefer to use a jig into which the members are forced, thereby aligning individual members by substantially closing any openings between adjacent members, and aligning the entire group of members as well. Because the members extend around the hull from gunwale to gunwale, the section will comprise a transverse unitary section of the hull. The upper or deck ends of the members are tied together, so that the whole section may be handled as a unit.

By means of suitable framing the entire unitary section is mounted to revolve about a horizontal axis. By revolving the section about said axis all of the joints will be moved into horizontal position and may be welded from above while in this horizontal position.

A number of such unitary transverse sections of the hull are aligned on the shipyard ways and welded or otherwise fastened together to form the ship hull. Additional plates or strengthening members are preferably used at the joints between such hull sections wherever the welding operation must be carried out on joints not in a horizontal position.

The unitary sections are combined to form the straight portion amidships of the ship hull. The bow and stern sections are constructed either in place—or as separate unitary sections and incorporated in the hull construction.

In the drawings,

Fig. 7 is a plan view of a jig used to align the structural members of the hull.

Fig. 8 is a side elevation of the jig of Fig. 7.

Fig. 9 is an end elevation of the jig of Fig. 7 taken from the plane A—B.

In the drawings like reference numerals designate like parts.

Figure 1:
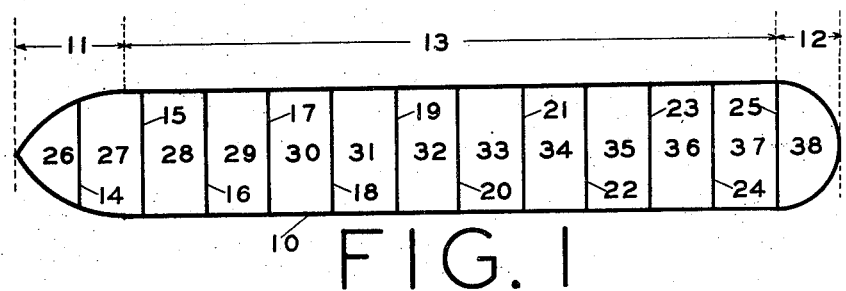
Fig. 1 is a plan view of a ship's hull.

Referring to Fig. 1, reference numeral 10 designates the hull of a ship of which 11 is the bow portion, 12 is the stern portion and 13 is the amidships or central portion of the hull. The bulkheads 14 to 25 inclusive divide the hull into a series of compartments, 26 to 38 inclusive. Each compartment with its adjacent bulkheads forms a complete transverse section of the hull.

Each of the transverse sections of the central portion of the ship is constructed as a separate unit and these unitary transverse sections are later assembled and incorporated into the hull of the ship.

Referring to Figs. 2 and 3, 39 to 51 inclusive designate the individual members which extend from one deck of the ship around the hull to the other deck, this is, from gunwale to gunwale. Welded to the member 39 is the bulkhead 52 which is co-extensive with the cross section of the ship.

A false or temporary bulkhead 53 is secured in place, preferably by tack welding, to the member 50. Both of the bulkheads are provided with the holes 54 and 55 positioned on a line through the center of gravity of the complete section.

Figure 4:
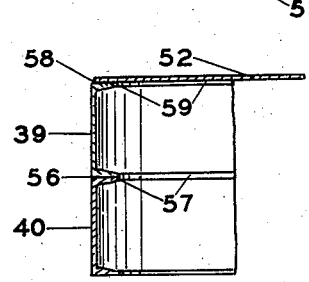
Fig. 4 is a cross section of two individual transverse members and a portion of a bulkhead.

Fig. 4 is a cross section through two of the individual members 39 and 40 showing the bulkhead plate 52. Welds are made along the joints 56, 57, 58 and 59.

Figure 5:
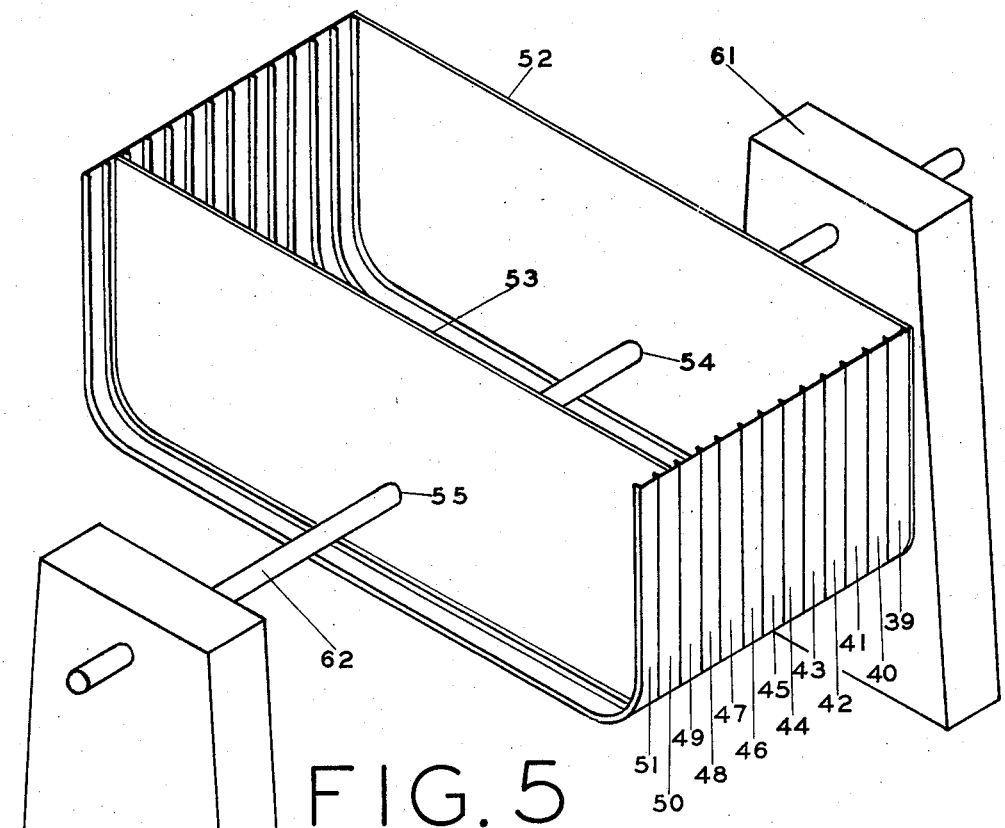
Fig. 5 is a view of a unitary section of the hull, mounted to revolve about a horizontal axis.

Referring to Fig. 5, 60 and 61 are pedestals supporting the horizontal shaft, 62. Mounted on the shaft 62 is the unitary transverse section of Fig. 2 made up of the members 39 to 51 inclusive and with the bulkheads 52 and 53. The shaft 62 passes through the holes 54 and 55.

Since the holes 54 and 55 are on a line through the center of gravity of the unitary section the same will be in equilibrium on the shaft 62 and the section may be revolved about the axis of the shaft 62.

Figure 6:
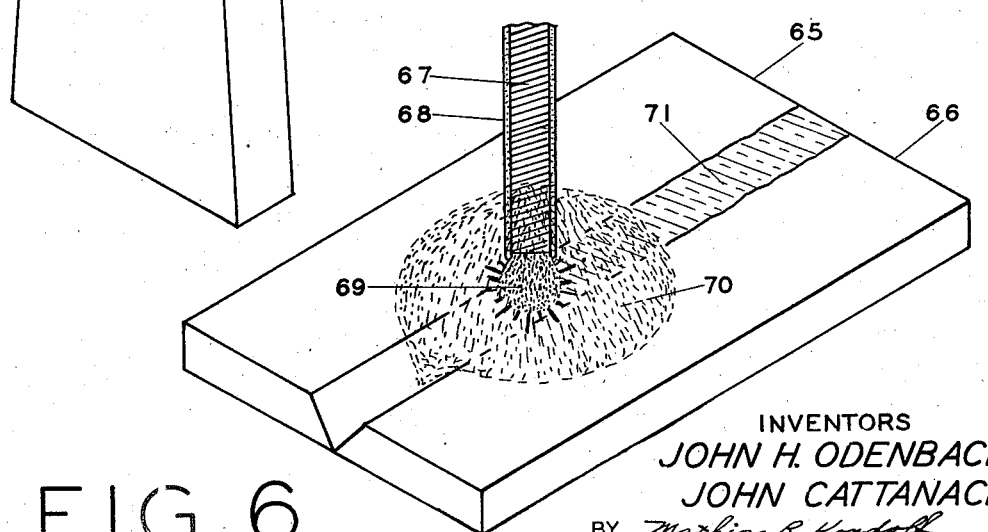
Fig. 6 is a diagram showing the elements of "shielded arc" welding.

Fig. 6 is included in the drawings to show in diagrammatic form the method of welding with a shielded arc. 65 and 66 represent two plate sections being welded together while in a horizontal position. The welding rod 67—which is shown in section—is provided with a coating 68.

The electrical connections to the welding rod and the plates are not shown, but will be understood.

In the welding operation the arc 69 is formed between the rod 67 and the plates 65 and 66 and the welding metal of the rod 67 is melted and flows between the plates 65 and 66 to form the weld. The coating 68 melts and flows down about the arc, where a part of the coating is gasified and forms the protecting envelope 70 of inert gas about the arc and around the molten metal of the weld. The surplus coating flows down and forms a slag cover or layer over the top of the welded metal as shown at 71. From the diagram of Fig. 6 it will be noted how the oxygen and nitrogen of the air is prevented from coming in contact with the arc or with the molten pool of the weld while the same is setting.

As pointed out above, to obtain full efficiency of the shielded arc method of welding it is important that the welding be done in a horizontal position.

In aligning the individual members which form each unitary transverse section of the hull we prefer to use a frame or jig. This jig is of a size to guide and align the section members prior to securing them together. The jig is operated in the following manner:

The members are entered at one end of the jig and are forced through and out at the other end of the jig.

As each additional member is aligned within the jig it is tack-welded to the preceding member until the desired number of members have been assembled to form a unitary section of the hull. When the first member protrudes from the jig we prefer to attach thereto, by tack-welding, the bulkhead plate 52 of the full transverse dimension of the hull. This serves to hold the first member in alignment.

Figure 2:
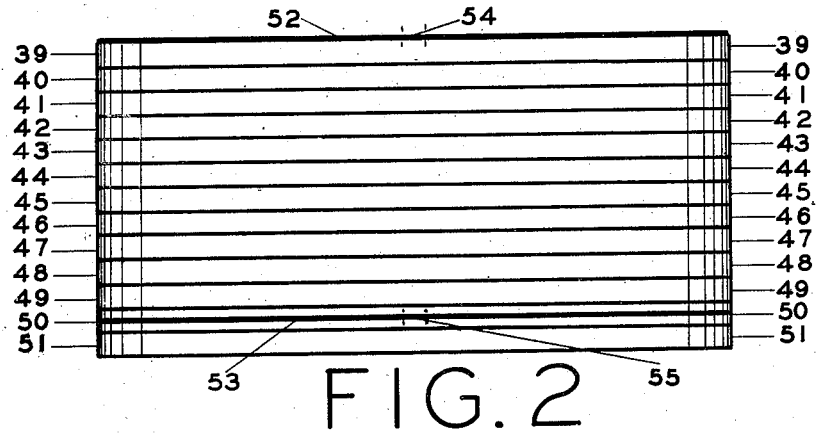
Fig. 2 is a plan view of a unitary transverse section of the hull.
Figure 3:
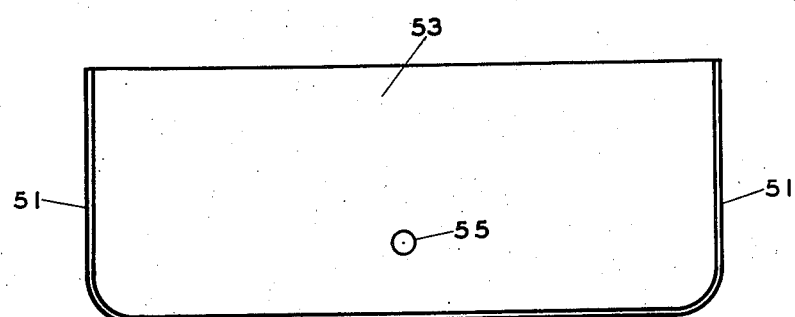
Fig. 3 is the section of Fig. 2 viewed in elevation.

Before the last member is forced from the jig, a false or temporary bulkhead 53 is secured by tack welding in position near the end of the section as shown in Fig. 2.

In this manner the alignment of the entire unitary section is readily accomplished and this alignment is maintained as described during the operation of revolving the section about the horizontal axis so that the permanent welds may be made while the joints are in a horizontal position.

In making the tack welds to hold alignment we prefer to do so at short intervals along the joints both within and without the hull section.

Fig. 7 is a plan view of a jig adapted to carry out the alignment of the structural hull members. This jig comprises a base 75 supporting oppositely disposed pairs of vertical posts 76, 77, 78 and 79, and an end wall 80. Bars 81 and 82 are mounted on the posts and are adapted to guide the preformed members in their travel through the jig. A series of jackscrews 85 are mounted in the end wall 80 in line with the channel members and are used to force the members through the jig.

As shown in Fig. 7, a group of channel members 39 to 51 inclusive have been forced through the jig and as diagrammatically shown at 87 and 88 this group of members have been tackwelded so that a unitary section is aligned within the jig. The openings between the vertical posts provide access to the exterior of the members and enable the tackwelding to be carried out both within and without the hull section. The first member 39A of the next group of members to be aligned by the jig is shown within the jig and the pressure exerted by the jackscrews 85 has caused the first member 39 of the original group to protrude from the jig in a position where the bulkhead plate 52 may be tackwelded to this first member 39 as previously described.

In permanently welding the members together we revolve the section so that the joint to be welded is in a horizontal position and then proceed to make the permanent weld from above with intermittent or skip welds. That is, we will weld a short distance, and then skip a considerable distance and weld another short length of joint. We find it advantageous to move from one side of the hull to the other side and then back again in order to prevent undue heating of the hull members. In this way we eliminate excessive heating of the members and largely avoid any "locked up" stresses in the members due to contraction after extreme heat.

In the above description and drawings we have not shown details of keels or keelsons, deck girders and decks, nor any incidental structural members which it may be desired to incorporate in the ship in specific cases. Owing to the great strength obtained by our method of construction, the use of framing and plating is unnecessary except for the bow and stern sections which, because of their contour, we ordinarily prefer to construct in this manner. Sections of keels or keelsons, in box girder or other form, may be welded in place between the bulkheads if desired, after the several unitary sections of the hull have been asembled.

This application is a continuation in part of our prior application, Serial No. 647,874, filed Dec. 19, 1932.

We claim:

1. The method of constructing the hull of a ship, including a plurality of transverse sections, which comprises the steps of preforming structural members to conform to the periphery of said hull and of a length to extend around the hull from gunwale to gunwale; entering said members individually at one end of a jig; forcing each member into alignment with the previously entered member in said jig; tackwelding the joint between each member and its adjacent member while said members are aligned within said jig; attaching bulkheads adjacent to the end members in said jig; revolving said members and bulkheads and further welding said joints while said joints are in a horizontal position whereby a transverse section is fabricated; combining a plurality of said sections and welding the joints between adjacent sections to form a portion of said hull.

2. The method of constructing the hull of a ship, including a plurality of transverse sections, which comprises the steps of preforming structural members to conform to the periphery of said hull and of a length to extend around the hull from gunwale to gunwale; entering said members individually at one end of a jig; forcing each member into alignment with the previously entered member in said jig; tackwelding the joint between each member and its adjacent member while said members are aligned within said jig; revolving said members and further welding said joints while said joints are in a horizontal position whereby a transverse section is fabricated; combining a plurality of said sections and welding the joints between adjacent sections to form a portion of said hull.

3. The method of constructing the hull of a ship including a plurality of transverse sections which comprises the steps of pre-forming structural members to conform to the periphery of said hull and of a length to extend around the hull from gunwale to gunwale; forcing a group of said members into a jig to align said members; tackwelding the joints between said members while said members are aligned within said jig; attaching bulkheads adjacent to the end members in said jig; while said members are aligned within said jig; revolving said members and bulkheads and further welding said joints, while said joints are in a horizontal position, whereby a transverse section is fabricated; combining a plurality of said sections and welding the joints between adjacent sections to form a portion of said hull.

4. The method of constructing the hull of a ship including a plurality of transverse sections which comprises the steps of pre-forming structural members to conform to the periphery of said hull and of a length to extend around the hull from gunwale to gunwale; forcing a group of said members into a jig to align said members; tackwelding the joints between said members while said members are aligned within said jig; revolving said members and further welding said joints, while said joints are in a horizontal position, whereby a transverse section is fabricated; combining a plurality of said sections and welding the joints between adjacent sections to form a portion of said hull.

5. The method of constructing the hull of a ship including a plurality of sections, which comprises the steps of pre-forming structural members to conform to the periphery of said hull; forcing a plurality of said members into a jig to align said members; tack-welding the joints between said members while said members are aligned within said jig; revolving said members and further welding the joints between said members while said joints are in a horizontal position, whereby a section of said hull is fabricated; combining a plurality of said sections and welding the joints between adjacent sections to form a portion of said hull.

6. The method of constructing the hull of a ship including a plurality of transverse sections which comprises the steps of pre-forming structural members to conform to the periphery of said hull; entering said members individually at one end of a jig; forcing each member into alignment with the previously entered member in the jig, until a series of said members has been assembled; tackwelding the joint between each member and its adjacent member in said series, while said members are aligned within said jig; revolving said members and further welding the joints between said members, while said joints are in a horizontal position whereby a transverse section of said hull is fabricated; combining a plurality of said sections and welding the joints between adjacent sections to form a portion of said hull.

7. The method of constructing a transverse section of a hull of a ship which comprises the steps of pre-forming structural members to conform to the periphery of said hull and of a length to extend around the hull from gunwale to gunwale; entering said members individually at one end of a jig; forcing each member into alignment with the previously entered member in the jig; tackwelding the joint between each member and its adjacent member in said jig, while said members are aligned within said jig; and attaching bulkheads adjacent to the end members in said jig, whereby a transverse section of said hull is fabricated.

8. The method of constructing a transverse section of a hull of a ship which comprises the steps of pre-forming structural members to conform to the periphery of said hull; entering said members individually at one end of a jig; forcing each member into alignment with the previously entered member in said jig; tackwelding the joint between each member and its adjacent member in said jig, as each member is aligned within said jig, removing said members from said jig and further welding said joints to fabricate a transverse section of said hull.

9. The method of constructing a section of a hull of a ship which comprises the pre-forming of structural metallic members to conform to the periphery of said hull; forcing a plurality of said members, making up said section, into a jig to align said members; tackwelding the joints between said members and attaching bulkheads adjacent to the ends of said section, while said members are aligned within said jig; revolving said section and welding the joints between said structural members, while said joints are in a horizontal position.

10. The method of constructing a section of a hull of a ship which comprises the pre-forming of structural metallic members to conform to the periphery of said hull; forcing a plurality of said members, making up said section, into a jig to align said members; tackwelding the joints between said members while said members are aligned within said jig; revolving said section and further welding the joints between said structural members, while said joints are in a horizontal position.

11. The method of constructing a section of a hull of a ship which comprises the pre-forming of structural metallic members to conform to the periphery of said hull; forcing a plurality of said members, making up said section, into a jig to align said members; tackwelding the joints between said members; attaching bulkheads to said section, while said members are aligned within said jig; and removing said section from said jig and further welding said joints to complete said section.

12. The method of constructing a section of a hull of a ship which comprises the pre-forming of structural metallic members to conform to the periphery of said hull; forcing a plurality of said members, making up said section, into a jig to align said members; tackwelding the joints between said members, while said members are aligned within said jig; and removing said section from said jig and further welding said joints to complete said section.

JOHN H. ODENBACH.
JOHN CATTANACH.